Nov. 11, 1930.  G. A. AIKEN ET AL  1,781,660
LOCK WASHER
Filed Jan. 14, 1929  2 Sheets-Sheet 1

Inventor
G. A. Aiken
J. R. Rorston,
BY
ATTORNEY

Nov. 11, 1930.      G. A. AIKEN ET AL      1,781,660
LOCK WASHER
Filed Jan. 14, 1929      2 Sheets-Sheet 2
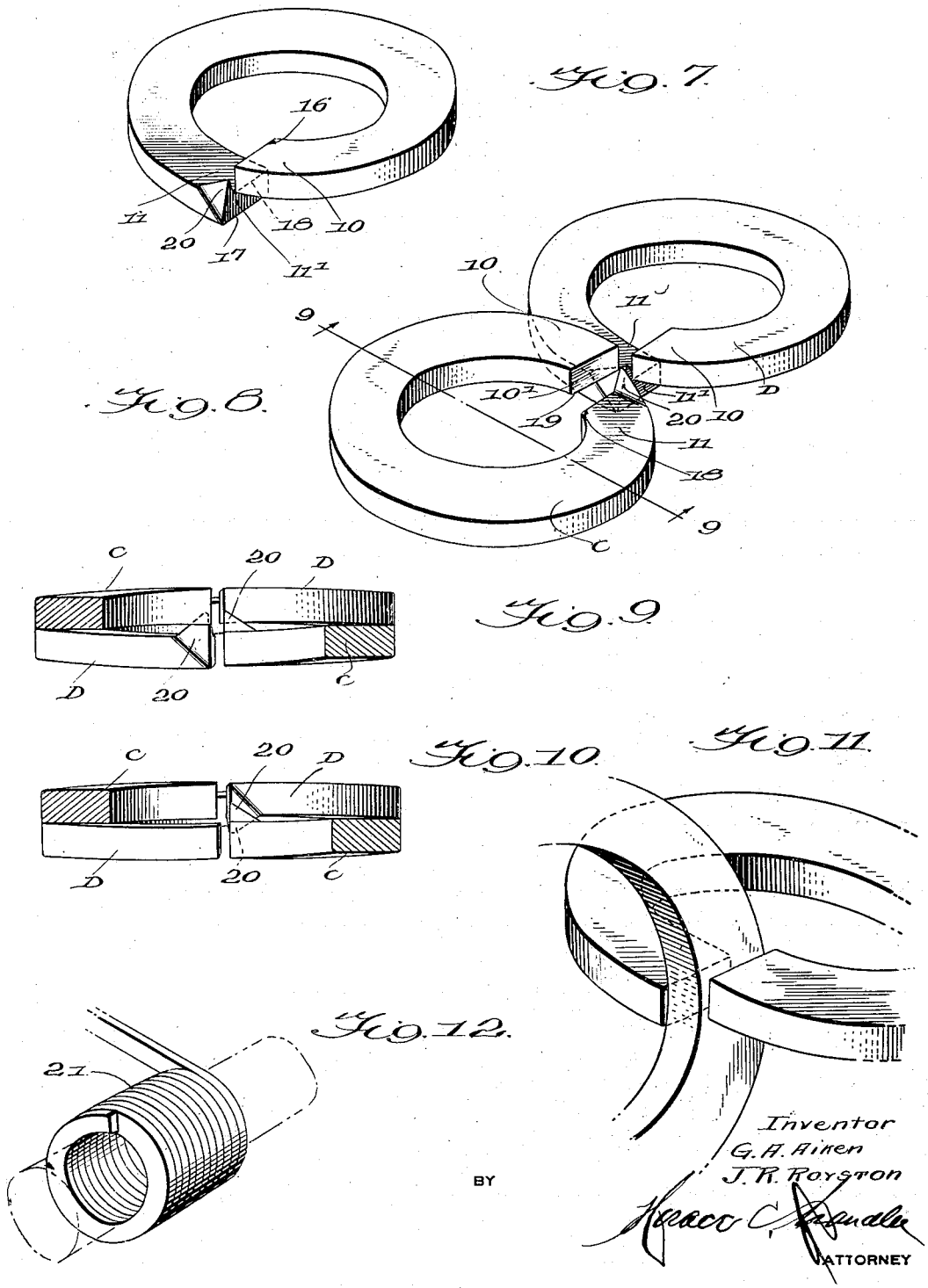

Patented Nov. 11, 1930

1,781,660

UNITED STATES PATENT OFFICE

GLEN A. AIKEN AND JOSEPH R. ROYSTON, OF PITTSBURGH, PENNSYLVANIA

LOCK WASHER

Application filed January 14, 1929. Serial No. 332,539.

This invention relates to lock washers for nuts, bolts, etc. of the split-ring type and in the form of a helical segment.

Washers of this type are usually sold and handled in bulk and, as generally constructed, they will interlink and become tangled together. As a result, a large amount of time is consumed in separating the tangled washers before they can be used. This tangling has been found to be particularly objectionable when such washers are used in the fabrication of machines made under the present day mass production methods.

With the foregoing in view, it is the principal object of this invention to provide a washer of the type mentioned which will be so constructed as to prevent interlinking under normal conditions; that is to say, when subjected to the treatment usually encountered in handling, shipping, etc. and preferably one that will not interlink under any condition.

It is a further object to produce a non-tangling washer of the type herein described without increasing the cost of manufacture.

In the drawings forming a portion of these specifications, in which like reference characters indicate corresponding parts in the several views;

Figure 7 is a perspective view of the improved washer.

Figure 8 is a view similar to Figure 3, but illustrating washers embodying the present invention.

Figure 9 is a vertical section on the line 9—9 of Figure 8.

Figure 10 is a similar view to that shown in Figure 9, but representing one of the washers reversed, so that the abutments 20 lie one above the other.

Figure 11 illustrates an obvious cause of interlinking.

Figure 12 illustrates a coil from which washers herein referred to are usually cut.

Figure 1:
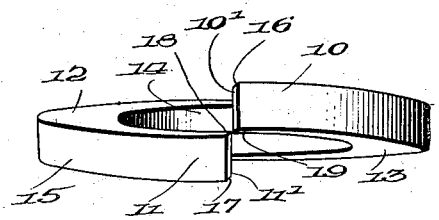
Figure 1 is a side elevation of a washer generally used, which will interlink.
Figure 2:
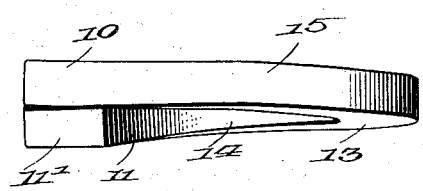
Figure 2 is a similar view of the same washer taken at a right angle to Figure 1.

As shown in Figures 1 and 2 the washer having the objectionable interlinking characteristic is formed of stock of angular cross section and comprises a helical segment having the two end portions 10 and 11, which terminate at the end faces 10' and 11', respectively. The segment further includes the work-engaging faces 12 and 13, the inner face 14, and the outer face 15. The end faces 10' and 11' meet the work-engaging faces at an angle to form the gripping edges 16 and 17 and the inner edges 18 and 19, the former being the outermost of said edges and the latter being the inner, mutually adjacent edges. It will be noted, by reference to Figure 1, that the faces 10' and 11' are spaced slightly apart and that the segment of which the washer is formed is less than 360° in circumference, so that no parts of the washer overlap.

Obviously, in order to provide a washer of the present type that will not interlink, it is necessary for the space between the end faces of the segment to be such as will prevent one washer from passing between the end faces of another, in the manner illustrated in Figure 11. This may be accomplished by making the space between the end faces 10' and 11' less than the smallest cross-sectional dimension of the stock. In some cases this space may be exactly the same as the smallest cross-sectional diameter of the stock, but only when said stock is so rough as to prevent one washer from passing between the ends of another in the manner mentioned. It will be understood, however, that the space between the end faces must be such as will prevent another washer from passing therethrough in the manner illustrated in Figure 11.

Figure 3:
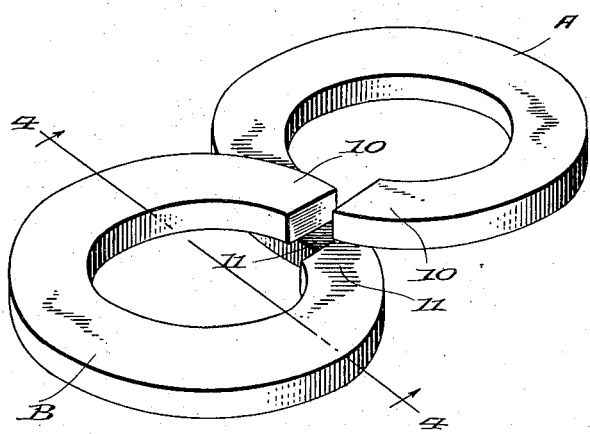
Figure 3 is a perspective view of two washers such as illustrated in Figure 1 arranged in the position in which interlinking usually occurs.
Figure 4:
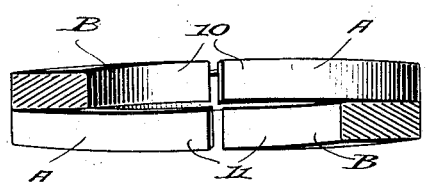
Figure 4 is a vertical section on the line 4—4 of Figure 3.

Even when the end faces of the segment are spaced apart less than the smallest cross-sectional diameter of the stock, to prevent interlinking in the manner illustrated in Figure 11, two washers, such as illustrated in Figure 1, will interlink when brought together in the manner shown in Figures 3 and 4. When brought together in that position, such washers will interlink because the end portion 10, of the washer A can pass over the end portion 11 of the washer B, while the end portion 11 of the washer A will pass beneath the end portion 10 of the washer B. The present invention provides an obstacle or abutment to prevent these ends from passing each other in this manner. It has been common practice to construct washers such as shown in Figure 1 with the space between the ends less than the smallest cross-sectional dimension of the stock and, therefore, no claim is made to this feature.

Figure 5:
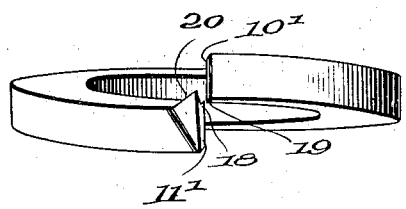
Figure 5 is a view similar to Figure 1, but showing a washer made in accordance with the present invention.
Figure 6:
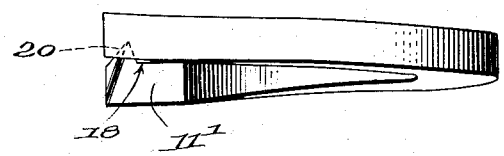
Figure 6 is a view similar to Figure 2 but showing the improved washer.

The present invention consists of a washer of the general type shown in Figure 1, but having a slight projection or abutment 20 on one of its ends, as clearly illustrated in Figures 5 and 6. This abutment is formed at the extremity of one of the end portions of the segment and projects from a working face of the washer at one of the inner edges 18 or 19, it being shown at the former edge in the drawing. It will be noted, by reference to Figures 6 and 7, that the projection or abutment does not extend entirely across the edge 18, on which it is formed, but rises to practically a point at the outer end only of said edge, so that if the washer becomes so nearly flattened, by a nut being screwed into place, as to cause the abutment to project above the gripping edge 16, it will become sheared off by a corner of the nut and will not prevent further rotation thereof. Thus, it will not appreciably retard the rotation of a nut in connection with which this washer is used. It will also be noted that the said abutment is, in effect, an extension of a portion of the end face 11'.

While the washer illustrated in Figure 5 is somewhat less than 360° in circumference it must be understood that my improvement may be embodied in a washer in which the segment is 360° in circumference, but no more, as it is only necessary for the end faces 10' and 11' to be sufficiently spaced to permit the inner edges 18 and 19 to pass, so that the washer may be compressed. In fact, it has been found advisable to form the segment of a length such as will bring the end faces as close together as possible without preventing compression of the washer, as the abutment may then extend along the marginal edge of the washer to a minimum degree, so that its width will be reduced to a minimum. It has also been found advisable, when forming the helical coil as illustrated in Figure 12, to wind the stock so that each successive convolution is as close to each preceding convolution as possible, so that the various convolutions will practically contact, as the abutment may then be formed to project from the work-engaging face of the washer to a minimum degree, so that its height will be reduced to a minimum. That is to say, when the end faces 10' and 11' are spaced apart to the slightest degree, so that the segment approaches 360° as nearly as is practically possible, and when the various convolutions of the coil 21 are as close together as possible, a minimum amount of stock need be swaged from the segment to produce the abutment.

The preferred method of forming the abutment 20 is by forcing out the stock of the washer where the inner edge 18 meets the outer face 15, by means of the tool with which the washers are cut from the coil 21 illustrated in Figure 12, so that said washers may be cut and said abutment formed at a single operation, causing no increase in the cost of manufacture. It will be understood, however, that the abutment may be swaged from the washer stock in any desired manner, either before or after the washer is coiled.

It will be seen that when two washers embodying the present invention are brought together in the manner shown in Figures 8 and 9, they will not interlink for the reason that the abutment 20, on the end of the washer C will engage the adjacent end portion 10 of the washer D and, at the same time, the other end of the washer C will engage the abutment 20 on the other end of the washer D, thus preventing the two ends of the washer D from passing the corresponding ends of the washer C. If the washer D should be inverted, as shown in Figure 10, its abutment 20 would contact with the abutment 20 of the washer C, so that the ends of the washers would not pass each other and cause interlinking.

From the foregoing it will be seen that the present invention has produced a washer which will not interlink, yet is a helical segment not more than 360° in circumference, with no overlapping portions. It is known that washers of the general type shown in Figure 1 have been provided with spurs to increase their holding power, but these spurs have been placed at the gripping edges, of necessity, and not at the inner edges, as in the present instance.

It will be understood that various modifications in the construction illustrated herein may be made without departing from the spirit of this invention. For example, while the drawings illustrate washers formed of rectangular stock, it must be borne in mind that the present improvement may be applied to washers in which the stock is provided with one or more rounded faces, so that a cross section of the stock will somewhat approach a circle or an ellipse. The working faces of the washer should, however, have a sufficient degree of flat surface to support the pressure to which the washers may be subjected.

What is claimed is:

1. A compression spring washer of the split ring type comprising a helical segment not more than 360° in circumference having work engaging faces, an outer face, and an abutment, said abutment comprising an extension swaged from the outer face and extending beyond a work engaging face.

2. A split helical washer not more than 360° in circumference having one of its work engaging faces unaltered but the other work engaging face at one end having an abutment interrupting a prolongation of the helical surface of the opposed unaltered work engaging face.

3. A washer as in claim 2 in which the abutment is formed of metal distorted from the original helical washer without substantial change from the original amount of metal.

4. A washer as in claim 2 in which the split between the opposed ends is of less width than the least cross section dimension of the washer.

5. A compression spring washer of the split ring type comprising a helical segment not more than 360 degrees in circumference having an extremity adapted to engage a nut to prevent rotation thereof, and having means to prevent interlinking with another of said washers.

6. A compression spring washer of the split ring type comprising a helical segment having work engaging faces and end faces, one of said end faces being approximately at right angles to the work engaging faces and the other end face being extended to provide means positioned opposite the first mentioned end face to prevent interlinking of said washer with another of said washers.

7. A compression spring lock washer of the split ring type comprising a helical segment having end faces, an outer face, and work engaging faces, and an abutment swaged from adjacent portions of one end face and said outer face and extending from one work engaging face and past the other work engaging face whereby to prevent interlinking of said washer with another of said washers.

8. A compression spring lock washer of the split ring type comprising a helical segment having means for engagement with a nut to prevent rotation thereof and having an abutment on one end to prevent interlinking, said abutment being of such cross sectional dimensions as to permit of its being sheared off by a corner of an engaging nut.

In testimony whereof, we affix our signatures.

GLEN A. AIKEN.
JOSEPH R. ROYSTON.